W. A. Tangeman.
Knitting Mach.
Nº 85546  Patented Jan. 5. 1869

Attest
Moritz B. Philipp
James Moore

Inventor
W. A. Tangeman

UNITED STATES PATENT OFFICE.

WILLIAM A. TANGEMAN, OF LOCKLAND, OHIO.

IMPROVEMENT IN KNITTING-MACHINES.

Specification forming part of Letters Patent No. 85,546, dated January 5, 1869.

*To all whom it may concern:*

Be it known that I, WILLIAM A. TANGEMAN, of Lockland, in the county of Hamilton and State of Ohio, have invented certain new and useful Improvements in Knitting-Machines; and I do hereby declare that the following is a full, clear, and exact description of the construction and operation of the same, reference being had to the annexed drawings, making part of this specification, in which—

Figure 1:
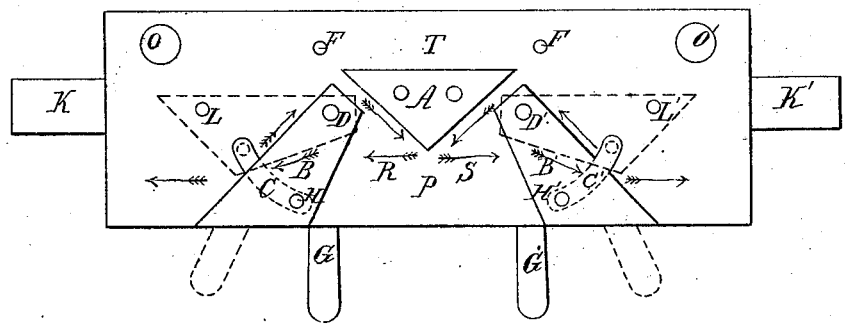
Figure 2:
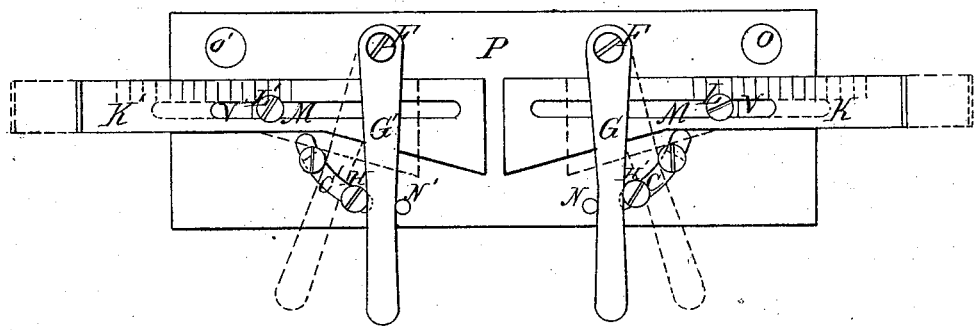

Figure 1 is a reverse view of my lock. Fig. 2 is a top or outside view of the same as seen when attached to the reciprocating carriage of a knitting-machine.

Similar letters refer to similar parts in all the drawings.

The improvements herein specified are adapted to knitting-machines having two straight rows of needles.

Some of the advantages arising from the use of my improvements are, first, they enable a knitting-machine, such as above referred to, to complete the stocking automatically, instead of making the same by removing the loops and joining parts of the stocking together when removed from the machine, as now done by the Lamb process; second, the cam-stops at the ends of the machine, as at present used, are dispensed with; third, it requires less power to run the machine, and there is also less liability to lose the first stitch in any particular row, as will be more particularly described hereafter.

P is a plate, upon which the working parts of my improved lock are located. A is a V-shaped cam, permanently attached by rivets to the plate P. B B' are wing-cams, which turn upon pivots D D', Fig. 1, at the ends nearest the V-shaped cam. C C' are curved slots in the plate P, which limit the movement of the screws H H'.

The screws H H' are riveted to the wing-cams B B' on the reverse side of the plate P, Fig. 1. The said screws pass through the slots c c' in the plate P, and their heads appear upon the upper side of the plate, as shown in Fig. 2, and the position of the wing-cams is regulated from the upper side by means of them, as hereinafter more particularly described.

F F' are pivots, which bind the levers G G' to the plate P. There are washers between the plate and the levers, to raise the latter from contact with the former and permit the sliding graduated pieces K K' to pass easily between them.

G G' are levers, which raise and lower the wing-cams B B'. When they are pushed in the direction of the red lines shown in Fig. 2 they press against the screws H H', which are attached to the wing-cams, raising the said screws to the position shown by the red lines in Fig. 2, or so far as the sliding graduated pieces K K' will permit, thereby removing the wing-cams from contact with the needle-shanks. When, however, the levers are placed in the position of the black lines in Fig. 2—that is, at right angles, or nearly so, to the slides K K'—the wing-cams are in position to act upon the needles.

Stops or rivets N N' are used as resting-places for the levers G G', to sustain the wing-cams against the pressure of the needle-shanks as they pass up the outer slope.

K K' are graduated sliding pieces, placed above or on the outside of the plate P, Fig. 2. They are provided with slots M M', by means of which they slide upon the guide-pieces V, V', and screws or rivets L L', attached to the plate P, which serve to keep and guide the pieces K K' in their proper position when they are pushed forward or back.

The lower edges of the slides K K' are inclined downward, from near the middle to the end, toward the center of the plate P. When said pieces are drawn out from the plate—that is, in the direction of the red lines in Fig. 2—these inclined edges come in contact with the screws H H', and press them down through the slots C C' in the direction of the rests N N'.

The sliding pieces K K' are provided with a graduated scale, as shown in Fig. 2, so that both pieces may be so fixed that the screws H H' may not rise more than a given distance from their respective levers G G'. When the screws H H', by this or equivalent means, are prevented from going to the full extent of the slots C C', of course the wing-cams, to which they are rigidly attached, are also prevented from moving any farther, and the graduated scales will measure or mark the exact distance to which the wing-cams may pass from the levers G G'.

The shape of the pieces K K' is such that, when drawn out, they remain stationary at any given point, resisting the pressure of the wing-cams, without the aid of screws or other means to fasten them.

The plate P is attached to the reciprocating carriage of a knitting-machine by means of screws through the holes shown at O O'. When the plate is attached to the machine the force of gravity will always bring the wing-cams down to the position shown by the dark lines in Fig. 1, when they are freed from the pressure of the shanks of the needles.

When the machine is put into operation, the needles occupying the position in which they are usually placed before commencing operation, if the reciprocating carriage is so placed that the lock herein described is on the left hand of the machine, on the side toward the operator, as it commences its route to the right hand of the machine the lower right-hand corner of the wing-cam B catches the shanks of the needles, and as the lock is carried to the right hand the needles are forced up the inclined plane in the direction of the blue arrow, as shown in Fig. 1, until they reach the top of the cam. They remain stationary at this point until the forward motion of the lock brings the V-shaped cam against them, when the pressure of that cam will force them down in the direction of the blue arrow until they arrive at the lowest point of said cam, where they will remain stationary until the forward action of the carriage brings the wing-cam B' against them, which they, by their pressure, will force up so far as the slide K will permit the screw H' to go, when the cam will rest, firmly supported by said slide; or if the slide is pushed in toward the center of the lock as far as it will go, said cam will be supported by the end of the slot C' farthest removed from the rest N'. The needles will be forced by the pressure of the wing-cam B' in the direction of the blue arrow until they arrive at the bottom, when, by the continued action of the machine to the right, they will be left in a row parallel to the length of the lock. After all the needles in operation have thus been passed by the second cam, said cam will, by the force of gravity, fall into the position shown by the dark lines in Fig. 1. When the machine is reversed the needles will travel in the direction shown by the red arrows, and be operated by similar forces, except that, when the carriage travels to the left, the wing-cam B' will perform the functions that the wing-cam B performed when the carriage traveled to the right, and the left side of the V-shaped cam performs the functions that the right side performed, and the wing-cam B performs the same functions that the wing-cam B' did, as previously explained.

It is evident that when the sliding pieces K K' are drawn out in the direction of the red lines shown at Fig. 2 they will, by their pressure on the screws H H', prevent the wing-cams from rising so far, by the pressure of the needles against them, as they otherwise would, and that in such case the needle-shanks are forced farther down on the plate P—that is, they are forced down a greater distance from the highest point they have reached—and will therefore make a longer stitch, so that the length or tightness of the stitch depends upon the distance the wing-cams are forced up, and that may be easily determined by any skillful operator by the graduated pieces K K'.

So far the description of the operation of the machine has been confined to the knitting of straight pieces; but when tubular work is desired, one set of needles knit from right to left only, and the opposite or parallel set knit from left to right only, so that the result of a motion of the carriage to the left and back again to the right is to make one complete row of stitches around the stocking or other tube. In order to accomplish this, it is only necessary that the lever G' be pressed in the direction shown by the red lines in Fig. 2, so as to carry up the cam B'. In that case, when the lock is carried from left to right, the wing-cam B being free to act upon the needle-shanks, half of the circle will be knit, while, when the carriage and locks are reversed, the cam B', being removed above the plane of the needle-shanks, as before described, will pass over them without knitting; but when the carriage is reversed, the wing-cam upon the opposite lock and immediately opposite the wing-cam B' will be brought into a position to act upon the opposite row of needles, and, while the wing-cam B' returns without knitting, the opposite lock will complete the circle. So, also, while the wing-cam B is knitting the wing-cam upon the other lock, and immediately opposite to it, will be raised above the plane of the needle-shanks, as in the case of the cam B', and will not knit. Thus, when the knitting-machine is in operation, making tubular work, but one cam on each lock will be in a condition to act on the needles, and the cams acting upon the needles will be those that are placed diagonally to each other.

When the knitting-machine is operated as just described, it will knit plain tubular work. This might have been done without the aid of my improved lock; but I will now describe the manner in which, by the aid of my improved lock, heels of stockings or other similar curves may be knit.

For this purpose a space, T, is left on the upper part of the reverse side of my lock parallel with the length of the lock, and between the upper edge or base of the V-shaped cam and the upper edge of the lock-plate, as shown in Fig. 1. It is plain that when any needles are drawn so far up in the machine that the shanks of such needles are in such space and above contact with the V-shaped cam, that such needles take no part in the work of the machine, which must then be operated with the remaining needles.

When the stocking has been commenced at the toe, and the tube has progressed so far that it is necessary to commence the heel or other curve, one of the locks is, by the levers G or G', prevented from operating its row of needles, while the other row of needles and accompanying lock knit the heel or other curve. To do this an equal number of the needles is drawn up on each end of the needle-plate of the machine, so that their shanks are in the space T, and so that the needles between those drawn up are subject to be acted upon by the lock. One row is then knit with these intermediate needles—say, from left to right—and when the carriage has moved to the right of the machine one of the needles previously drawn up at the left and the one which is next to the needles that are in operation are pushed down, so as to be in a position to knit when the carriage is moved to the left, and one (being the one which is next to the needles that are in operation) of the needles at the right is pushed down, and again the carriage moves to the right, when the next succeeding needle is brought into operation upon the other side; and so the needles are brought successively into operation, one after each movement of the carriage, until all are brought into operation.

This process will produce a curve or a part of a curve, and the extent or amount of curvature will depend on the number of needles that is drawn up on each side, the greater curvature being produced by drawing up a greater number of needles.

When the needles are first drawn up to knit a curve, the proper number to be taken up at each end for the heel of an ordinary stocking would be about one-sixth of the whole number in one of the straight rows of needles, or about one-third in all; but as different operators would desire to knit different-shaped heels, and as the amount of curve will always depend on the number of needles drawn up, it is impossible to give a definite rule suited to all cases. When the needles have all been pushed down they are again drawn up in the same way as before, and the operation above described is repeated until the curve, having extended nearly or quite to the corner of the heel, and it being necessary that the curve at that point should be increased, the number of needles drawn up should be increased to, say, one-fourth of the whole row on each side.

The curve here described may be varied by taking up more or less of the needles at first, and by taking up any greater or lesser number each time the operation is repeated until the heel or other curve has been completed, when all the needles may be brought into operation in the manner before described, and the knitting of the tube continued.

In this description I have supposed three repetitions of this operation sufficient to form the heel of a stocking; but it is evident that the operation may be performed a greater or less number of times in the process of turning the heel, depending, of course, upon the length of the curve desired. If the stocking has been commenced at the top of the leg, then the above process would be reversed—that is, the part of the heel having the greatest amount of curvature would be knit first. Of course, it will be understood that during this operation the levers G G' of the lock in use are both at right angles to the plate P, so that the wing-cams will be both in operation.

There is another way in which the heel of a stocking or other similar curve may be knit by my improved lock, which is as follows: One full row of needles is put in operation, and when the carriage has passed, say, from right to left, one needle at the right is drawn up, as before described, and the carriage moved to the right, when one needle is drawn up on the left, and thus, at each motion of the carriage, one needle is removed from operation, until nearly all the needles are thus removed, when the operation is continued by adding one needle after each motion of the reciprocating carriage, as heretofore described, until all the needles are again in operation. The result will be a piece which, if laid flat, would be nearly in the form of two isosceles triangles joined together at the angles opposite their respective bases; but as the needles come into operation, as before described, after forming the first triangle, they commence to form the tube, and when the needles are all in operation the heel will be formed; but the shape of the heel will depend on how near the piece would take the form of two triangles if it were a straight piece; or, in other words, it depends on how many of the needles are drawn up before they are again brought successively into operation.

It will be found that it requires much less power to work a knitting-machine having my improved locks than one operated by the old form of lock, and for this reason, that after the needles have ceased to be operated upon by the V-shaped cam they remain stationary until they are again operated upon by the proper wing-cam, because they must remain in the plane of the arrows R and S (shown in Fig. 1) until the motion of the reciprocating carriage toward them brings the proper wing-cam against them. While they are standing thus the hook of the needle is in the proper position to receive the yarn from the eye of the yarn-feeder, and the reciprocating carriage has progressed so far as to carry the eye of the yarn-feeder a considerable distance, in the direction in which it may be going, past the hook of the particular needles then at rest. This motion of the carriage will take up the slack of the yarn, if there is not more in slack than the distance between the eye of the yarn-feeder, when it has progressed as described, and the hook of the needle just before or at the time it is first touched by the second wing-cam, and at the point of time when the yarn is fed into the hook of the needle the yarn will be sufficiently tight to be caught by the hook, so as to prevent the hook from slipping past the yarn, of which there is danger, when there is slack in the yarn, when it is about to be caught by the hook of the needle; and by permitting the needles to remain at the point indicated— that is, after they have been acted upon by the V-shaped cam and before they have been acted upon by the proper wing-cam a sufficient length of time for the yarn-feeder to take up the slack of the yarn—the advantage above noted is secured, and the greater the distance between those points the more of the slack may be taken up. When the yarn is fed loosely to the machine there will be, at the commencement of each row to be knitted, a certain amount of slack yarn, which will have a tendency to cause the loss of one or more stitches at the commencement of each row, and to avoid such loose or slack yarn the yarn to be fed into the needles must be stretched more tightly; but in order to do this a considerable increase of power would be required to run the machine, and at the same time take the yarn from the apparatus used to hold it. But it is desirable that the yarn shall run loosely, and thereby save power, and as a complement to the efficiency of a knitting-machine thus run, it is necessary that there be mechanism to take up the slack of the yarn before the first needles of a row are fed, and the mechanism above described answers that purpose.

It is further evident that by increasing the time during which the needles are at rest, as before described, which may be done by increasing the distance between the wing-cams and the V-shaped cam, a greater amount of slack in the yarn may be permitted.

It is important to the successful operation of my improved lock, for the purpose just described, that the V-shaped cam should be of sufficient altitude to carry the needles so far down before they are permitted to remain at rest that they will be in the proper position to receive the yarn. The proportion shown in Fig. 1 will answer that purpose very well.

An important advantage arising from the use of my improved lock is this, that when the needles are drawn up above the V-shaped cam, as before described, and it is desired to bring the needles, or any of them, into operation, the V-shaped cam will take hold of the needle-shanks at a higher point on the needle-bed than the locks heretofore used, and draw them into operation—that is, my lock will take hold of the needle-shanks when they have been pressed down into the plane of the V-shaped cam, and draw them down to the point of the cam, where they remain at rest, as before described, in order that the yarn-carrier may tighten the yarn, and yet not draw them down so far that they would lose their stitches, while in all other locks at present in use, if the needles were pushed so far that the shanks would be caught by the operative mechanism, the needles would be drawn so far that they must lose their stitches, and this advantage I regard as one of the essential features of my invention. It will, however, be evident to any skillful mechanic that this feature of my invention could be easily retained and yet the form of the mechanism be greatly varied. Thus a channel or lane might be cut in a nearly diagonal direction through the wing-cams in common use, and the needle-shanks to pass through that lane, instead of going all the way down the wing-cam, and then around the V-shaped cam, past its apex, to a point about half-way down the V-shaped cam upon the opposite side, where the lane would commence in the other wing-cam, and where the needle might easily be made to rest by appropriate mechanism until the yarn-feeder had taken up the slack of the yarn.

Other modifications of my invention herein described would easily suggest themselves to any skillful mechanic.

Having thus described my invention, what I claim as new, and desire to secure by Letters Patent, is—

1. The graduated sliding bars K K', as and fer the purposes described.

2. The levers G G', dispensing with the cam-stops now in use, as and for the purposes described.

3. The combination, with a knitting-machine having two parallel straight rows of needles, of a lock constructed substantially as described, so that a portion of the needles may be elevated so as not to operate, and yet so as not to interfere with the proper working of the needles that are in operation for knitting the heels of stockings or other curves.

4. The V-shaped cam A, constructed and arranged with reference to the wing-cams, as shown, for the purpose of permitting the needles to remain at rest, so that the slack of the yarn may be taken up and power saved.

5. The devices herein described, arranged and operating, as shown, to draw the needles down to such a point that they are in a proper position to receive the yarn without drawing them down so far that they would lose their stitches.

W. A. TANGEMAN.

Witnesses:
JAMES MOORE,
MORITZ B. PHILIPP.